United States Patent
Rinne et al.

(10) Patent No.: US 7,983,236 B2
(45) Date of Patent: Jul. 19, 2011

(54) PILOT STRUCTURE FOR MULTICARRIER TRANSMISSIONS

(75) Inventors: Mika P. Rinne, Espoo (FI); Olav Tirkkonen, Helsinki (FI); Klaus Hugl, Helsinki (FI)

(73) Assignee: Nokia Corporation, Espoo (FI)

( * ) Notice: Subject to any disclaimer, the term of this patent is extended or adjusted under 35 U.S.C. 154(b) by 1125 days.

(21) Appl. No.: 11/528,896

(22) Filed: Sep. 27, 2006

(65) Prior Publication Data

US 2007/0070944 A1 Mar. 29, 2007

Related U.S. Application Data

(60) Provisional application No. 60/721,555, filed on Sep. 27, 2005.

(51) Int. Cl.
*H04B 7/216* (2006.01)
*H04J 11/00* (2006.01)
*H04J 3/06* (2006.01)
*H04L 27/28* (2006.01)

(52) U.S. Cl. ........ 370/342; 370/208; 370/350; 370/500; 370/503; 370/203; 375/260

(58) Field of Classification Search .................. 370/335, 370/310, 350, 491, 500, 464, 328, 480, 208, 370/203, 509–514, 342; 455/502–503; 375/145, 375/267, 260
See application file for complete search history.

(56) References Cited

U.S. PATENT DOCUMENTS

| | | | |
|---|---|---|---|
| 5,764,687 A * | 6/1998 | Easton | 375/147 |
| 5,867,478 A * | 2/1999 | Baum et al. | 370/203 |
| 6,545,997 B1 * | 4/2003 | Bohnke et al. | 370/347 |
| 6,741,578 B1 * | 5/2004 | Moon et al. | 370/335 |
| 6,775,242 B2 * | 8/2004 | Grilli et al. | 370/252 |
| 6,999,467 B2 * | 2/2006 | Krauss et al. | 370/441 |
| 7,764,593 B2 * | 7/2010 | Kim et al. | 370/208 |
| 2003/0072255 A1 * | 4/2003 | Ma et al. | 370/208 |

(Continued)

FOREIGN PATENT DOCUMENTS

WO WO-2005/015797 A1 2/2005

(Continued)

OTHER PUBLICATIONS

"Technical Specification Group Radio Access Network; Physical Layer Aspects for Evolved UTRA (Release 7)", 3GPP TR 25.814 vol. 1.2, 2005, 28 pages.

*Primary Examiner* — Matthew Sams
(74) *Attorney, Agent, or Firm* — Harrington & Smith

(57) ABSTRACT

Pilot sequences (for aiding a receiver in estimating a channel) are disposed in a frame structure that has subframes of sub-carriers and symbol positions. Locations of common pilot sequences are predetermined, and includes 1) in each subframe, a pilot sequence is disposed in a first symbol position for each of at least two staggered sub-carriers, and 2) in at least one subframe, at least one pilot sequence is disposed in other than the first symbol position and in a sub-carrier other than any of the at least two staggered sub-carriers. Dedicated pilot sequences, whose locations in the frame are not predetermined, are disposed in response to an indication of channel quality received over a wireless link. Common pilot sequences may relate to one or two transmit antennas, and dedicated pilot sequences may enable addition of third and fourth transmit antennas.

29 Claims, 8 Drawing Sheets

U.S. PATENT DOCUMENTS

| | | | |
|---|---|---|---|
| 2003/0227866 A1* | 12/2003 | Yamaguchi | 370/208 |
| 2004/0086055 A1* | 5/2004 | Li | 375/260 |
| 2006/0013338 A1* | 1/2006 | Gore et al. | 375/324 |
| 2006/0018287 A1* | 1/2006 | Walton et al. | 370/334 |
| 2006/0172704 A1 | 8/2006 | Nishio et al. | 455/67.11 |
| 2007/0153759 A1* | 7/2007 | Jung et al. | 370/342 |
| 2008/0212462 A1* | 9/2008 | Ahn et al. | 370/209 |

FOREIGN PATENT DOCUMENTS

WO    WO-2005/057870 A1    6/2005

* cited by examiner

PILOT STRUCTURE FOR MULTICARRIER TRANSMISSIONS

CROSS REFERENCE TO RELATED APPLICATION

This application claims priority to U.S. Provisional Application Ser. No. 60/721,555, filed on Sep. 27, 2005, the contents of which are incorporated in their entirety.

TECHNICAL FIELD

The exemplary and non-limiting embodiments of this invention relate generally to multicarrier communications, such as OFDM, OFDMA and MC-CDMA, and, more specifically, relate to disposition of pilot symbols within transmissions of such a multicarrier system.

BACKGROUND

The continuing drive to communicate more data from/to more users over a finite wireless bandwidth is driving refinements of multicarrier communication regimens such as orthogonal frequency division multiplexing (OFDM, OFDMA) and multicarrier CDMA (MC-CDMA). OFDM, for example, involves transmitting data on multiple frequencies for the duration of a symbol (typically on the order of about 10 to 100 microseconds, or even up to 1 ms in extreme). By using multiple carriers, termed subcarriers, communication is maintained when one or more subcarriers are adversely affected by narrow-band or multi-path interference. A key aspect of OFDM is that the subcarriers are formed by a mathematical transform that makes the individual subcarriers overlap to some extent. In other communication regimens, overlapping carriers cause interference. OFDM purposely overlaps subcarriers to increase data throughput, and avoid cross-interference by creating the subcarriers by a mathematical transform in an orthogonal manner so they do not interfere with each other even though they overlap in frequency. Use of multiple subcarriers enables a very high degree of scalability: various data rates can be adaptively supported by altering the combinations of subcarriers that form a channel. For example, high data rates are enabled by allocating symbols on many subcarriers in frequency over several time-symbols, to create one high-speed channel. The subcarriers are transmitted in parallel, each carrying a portion of the total data being sent.

For OFDM, Discrete Fourier Transform or Fast Fourier Transforms may be used. Other transforms exist as well. These transforms may include cosine or sine transforms, filterbank transforms or bi-orthogonal transforms. The properties of these transforms differ from properties of OFDM, but they may be applied similarly to create a multicarrier transmission. Even blocked transforms or interleaved transforms (IFDMA) may create alike transmission schemes, where a block of symbols is available on a number of frequency bins at a time.

Orthogonality among the various multicarrier sub-channels dovetails nicely with multi-antenna communications (Multiple Input Multiple Output MIMO and its variations Single Input Multiple Output SIMO and Multiple Input Single Output MISO), which enable increased data throughput and expanded multipath diversity. Multi-antenna transmissions enable extremely high peak-data rates that are increasingly desirable as the wireless transmission of high volume data, such as audio and graphical files, becomes more ubiquitous. Some of these data have also real-time requirements as audio, music and video streams. In order to facilitate high data rates among multiple users without increasing bandwidth, multi-antenna transmissions with high symbol rates set out stringent requirements for pilot sequences and pilot structures. Pilot symbols enable accurate channel estimation over wide bandwidth, which is necessary for reliable demodulation and decoding. Applying various different modulations as BPSK, QPSK, 16QAM and 64QAM set even increasing requirements for channel estimation, because of the sensitivity of demodulation to channel estimation accuracy. Further again, multiantenna transmission and reception techniques set high requirements for channel estimation, as reception typically requires independent channel estimation of all transmitted sequences from all antennas. However, pilot symbols themselves occupy bandwidth that would otherwise be used for data, so the amount of bandwidth used by pilot symbols, and the accuracy of the resultant channel estimate, must be balanced against the overhead within the symbol frame structure that those pilot symbols occupy.

UTRA is a universal terrestrial radio access protocol that is a standard for third generation mobile communications specified by 3GPP (third generation partnership project). UTRA is based on a wideband spread spectrum multiple access and hybrid time-division access methods that have been designed for frequency efficiency, mobility, and quality of service requirements. E-UTRA stands for evolved UTRA, which seeks to expand on the basics of UTRA to establish high performance requirements over a wide area coverage from large macro cells to small micro cells, with a large range of mobile velocity from 0 km/h up to 350 km/h for throughput values ranging from very low bit rates up to ~100 Mbps. This translates to operation over large range of signal-to-noise ratios, operation over one's own (geographic) cell to other (geographic) cell interference ratios, and very different channel coherence characteristics. Such disparate considerations tend to indicate that different solutions are needed to meet differing conditions of signal to noise ratios (SNR), interference, or whatever might be the limiting factor in maximizing data throughput.

Research is ongoing to meet these requirements using multi-antenna techniques. Researchers expect to achieve significant improvement of throughput values by transmit and or receive diversity at low signal-to-noise ratios with interference rejection combining. On the other hand, for high signal-to-noise ratios, in conditions where the practical rank of the channel so allows, multi stream transmissions from several transmit antennas to several receiver antennas are viable. For such multi-antenna configurations, several techniques of transmitting symbol streams or their rotations are well known. Also several ways of channel coding are known.

A problem arises in how to design pilot structures, which allow these versatile multi-antenna transmission techniques without adding excessive overhead and losing the efficiency of the frame structure. In any case, such pilot patterns need to be a-priori known in the frame structure and can not be varied, as the terminals need to trustworthy know, where to find the symbols of the pilot sequences. This shall also be possible for terminals, which do not have any information of the transmission yet i.e. at initial cell search. Therefore, pilot patterns and pilot code sequences are typically fixed and are written to the system specific standards.

Various pilot symbol schemes have been proposed for OFDM systems for E-UTRA. Reference in this regard may be had to "ORTHOGONAL COMMON PILOT CHANNEL AND SCRAMBLING CODE IN EVOLVED UTRA DOWNLINK", NTT DoCoMo, NEC, Sharp (London, UK, Aug. 29-Sep. 2, 2005); "PILOT SYMBOL STRUCTURE IN EVOLVED UTRA DOWNLINK", NTT DoCoMo, NEC, Sharp (London, UK, Aug. 29-Sep. 2, 2005); "EUTRA DOWNLINK PILOT REQUIREMENTS AND DESIGN", Motorola, (London, UK, Aug. 29-Sep. 2, 2005); "INTER-CELL INTERFERENCE MITIGATION USING ORTHOGONAL PILOT AMONG CELLS FOR DOWNLINK OFDM IN EUTRA", Panasonic (London, UK, Aug. 29-Sep. 2, 2005); and "DRX/DTX IMPACT ON COMMON PILOT CHANNEL IN E-UTRA DL", Nokia (London, UK, Aug. 29-Sep. 2, 2005). Also, 3GPP TR 25.814, ver. 1.2 "PHYSICAL LAYER ASPECTS FOR EVOLVED UTRA (Release 7)" serves as a background on the structural constraints that the inventors adopted in devising a solution to optimizing a pilot symbol structure.

SUMMARY

In accordance with one aspect of the invention is a method in which data is arranged for transmission in a frame structure, where the frame structure includes a series of subframes, each subframe having a plurality of frequency-divided sub-carriers and each sub-carrier having a plurality of time-divided symbol positions. In the method, pilot sequences for aiding a receiver in estimating a channel comprising the sub-carriers over which the data is to be transmitted are determined. In each subframe, a pilot sequence is disposed in a first of the plurality of symbol positions for each of at least two staggered sub-carriers. Also, in at least one subframe, at least one pilot sequence is disposed in other than the first symbol position and in a sub-carrier other than any of the at least two staggered sub-carriers. The frame comprising the data and disposed pilot sequences is then transmitted over the channel.

In accordance with another aspect of the invention is a computer program, tangibly embodied on a storage medium and executable by a processor, to perform actions directed toward transmitting pilot sequences in a frame structure. The actions include arranging data for transmission in a frame structure, where the frame structure includes a series of subframes, each subframe having a plurality of frequency-divided sub-carriers, each sub-carrier having a plurality of time-divided symbol positions. The actions further determine pilot sequences for aiding a receiver in estimating a channel, where the channel includes the sub-carriers over which the data is to be transmitted. In each subframe, a pilot sequence is disposed in a first of the plurality of symbol positions for each of at least two staggered sub-carriers. Also, in at least one subframe, at least one pilot sequence is disposed in other than the first symbol position and in a sub-carrier other than any of the at least two staggered sub-carriers. The frame with the data and the disposed pilot sequences is then transmitted over the channel.

In accordance with another aspect of the invention is a device, such as for example a base station or other network element, that includes an interleaver, a serial to parallel converter, an encoder, a memory, a processor, and at least two transmit antenna. The interleaver is configured to fit input data to time slots. The serial to parallel converter is configured to assemble the interleaved data into parallel blocks. The encoder is configured to map the blocks to symbols. The memory is configured to store a database of fixed locations within a transmission frame, and also to store computer instructions for the processor. The processor is coupled to the interleaver, the converter, the encoder, and to the memory. The computer instructions cause the processor to dispose pilot sequences in the fixed locations. Specifically, the fixed locations include: 1) a first of a plurality of symbol positions for each of at least two staggered sub-carriers in each sub-frame of a transmission frame, and 2) an other than the first symbol position and in a sub-carrier other than any of the at least two staggered sub-carriers in at least one of the sub-frames. The transmit antennas have an input coupled to an output of the processor, and are configured to transmit the input data and the pilot sequences in the transmission frame.

In accordance with another aspect of the invention is an integrated circuit that is configured to arrange pilot sequences in a transmission frame, where the transmission frame includes a plurality of subframes, each subframe having sub-carriers and symbol positions. Specifically, the pilot sequences are arranged such that a common pilot sequence is disposed in a first symbol position among regularly staggered sub-carriers in each subframe. Also, in at least one, a common pilot sequence is disposed in other than the first symbol position and in other than the said regularly staggered sub-carriers. The respective symbol position and sub-carrier in which each of the common pilot sequences is disposed is predetermined.

In accordance with another aspect of the invention is a system that includes a mobile station and a network element. The mobile station includes a transceiver, a memory, and a processor configured for wirelessly sending to a network element an indication of channel quality. The network element includes a transceiver, a memory, and a processor configured for receiving the indication of channel quality and for arranging data and pilot sequences in symbol positions and sub-carriers of subframes of a transmission frame. In the network element's arrangement of pilot sequences, a common pilot sequence is disposed in a first symbol position among regularly staggered sub-carriers for each of the subframes of the frame. Also, for at least one of the subframes, a common pilot sequence is disposed in other than the first symbol position and in other than the said regularly staggered sub-carriers. Furthermore, for at least one subframe, a dedicated pilot sequence is disposed at a symbol position and a sub-carrier that are selected based on the indication of channel quality that was received from the mobile station. The symbol positions and sub-carriers for the common pilot sequences are predetermined and stored in the memory of both the mobile station and the network element.

In accordance with another aspect of the invention is a mobile station that includes a transceiver, a memory, and a processor that together are configured for receiving at the transceiver over a channel a transmission frame that includes subframes, sub-carriers and symbol positions. The mobile station is further configured for determining, from the memory, predetermined locations of common pilot sequences. In an embodiment, this occurs after the mobile station has acquired time and frequency synchronization and is able to detect symbol sequences (e.g. by cross correlation and averaging techniques), so that the predetermined locations and sequences of common pilots are defined relative to the acquired frequency and timing reference, or their candidate values. These predetermined locations of the common pilot sequences are: 1) in a first symbol position of each subframe and staggered among regularly spaced sub-carriers, and 2) in an other symbol position of at least one subframe and in other than one of the staggered sub-carriers. The mobile station is further configured to estimate the channel using the common pilot sequences, to demodulate symbols of the transmission frame using the estimated channel, and to wirelessly send from the transceiver an indication of the channel quality.

These and other aspects are detailed with particularity below.

BRIEF DESCRIPTION OF THE DRAWINGS

The following description refers to the following drawing figures.

DETAILED DESCRIPTION

Figure 1A:
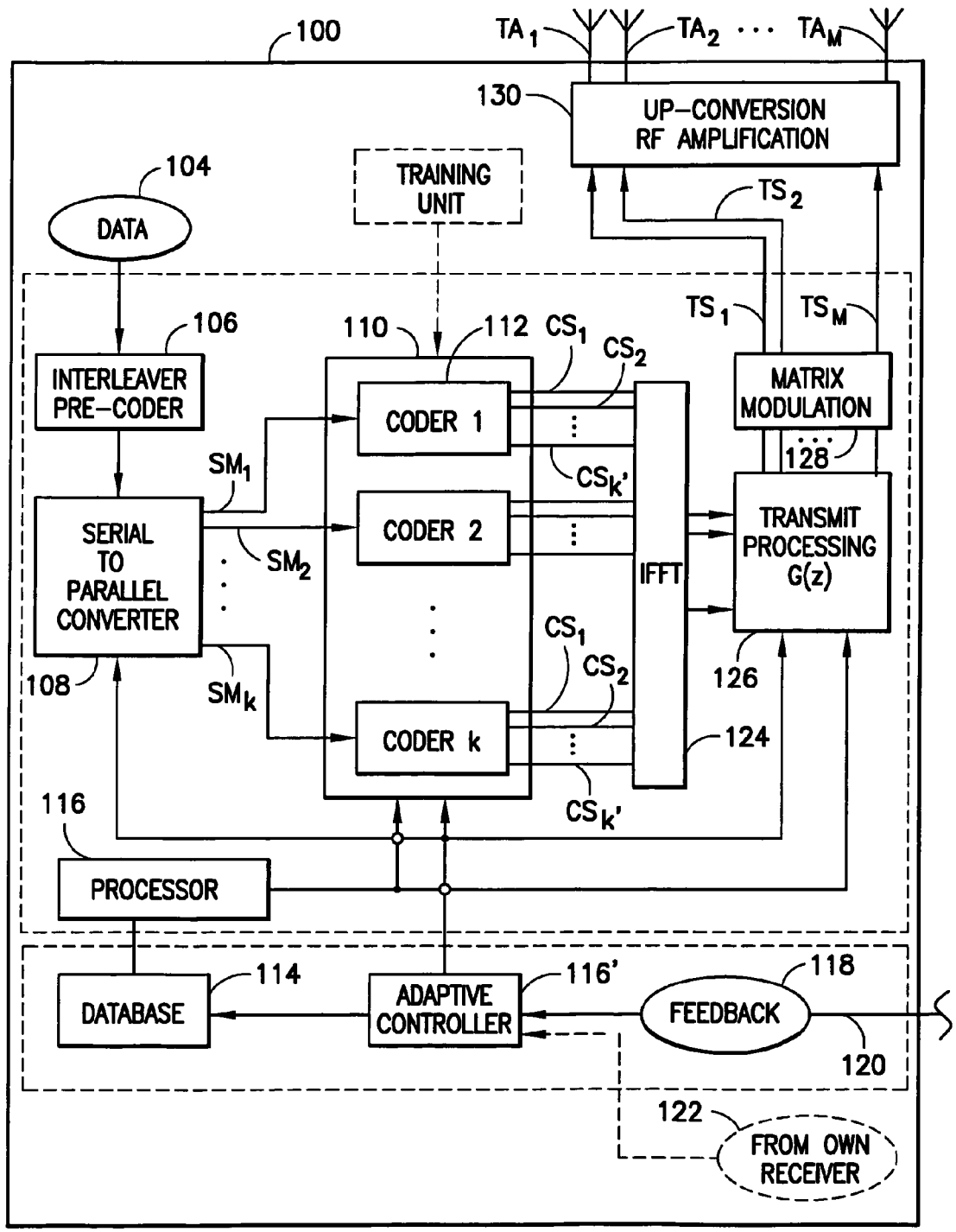
FIGS. 1A-1B are block diagrams of a transmitter and receiver, respectively, which may be used to implement embodiments of the invention.

Embodiments of this invention are contemplated to be readily implementable in base stations of a cellular communication system, which will create the common pilot structures disclosed herein, and dispose them at the indicated locations within a transmission frame. Mobile stations, the wireless user equipment, which access the network through the base stations, will then process these pilot signals and use them for channel estimation, which is important for demodulation and decoding of received symbols. Placement of the described dedicated pilot sequences are typically contingent on the channel quality conditions and other signalling received in a feedback channel from the mobile station/receiver terminal. Numerous other implementations may readily use the teachings herein. Pilot sequences/signals/structures are also termed herein as reference signals.

As opposed to other proposed pilot structures for E-UTRA (such as those noted in the background section), the pilot structures of this invention are seen to uniquely preserve the existing frame structure and efficiency with minimal signaling overhead that is still adjustable for various multi-antenna transmission schemes. Specifically, the proposals noted above are not seen to offer a general solution for varying conditions of channel, data throughput, and number of transmit antennas. Various embodiments of this invention may exhibit some or all of the following features;

provide sufficient pilot energy for detection and channel estimation;

provide enough pilot symbol resolution in time and frequency;

provide efficient frame structure and avoid excessive pilot overhead;

support any number of transmit antennas with optimal overhead and efficiency; and avoid complexity of the receiver to easily find positions of the pilot symbols, while enabling a sleep mode for the receiver.

provide pilot sequences, which also serve synchronization algorithms in addition to channel estimation algorithms.

The sleep mode noted above is when the receiver (e.g., the mobile station) is not actively communicating but occasionally monitors for potential paging messages on a discontinuous basis, enabling de-powering of many functions and circuits, thereby extending stand-by time.

The present disclosure describes a pilot signal structure, which allows efficient channel estimation for all single- or multi-antenna configurations, including beamforming, with optimal overhead in the frame structure. Beamforming is differential weighting of transmissions from the various multiple antennas, and consequential weighting of the received signal vectors at the receiver. As an overview, various embodiments of this invention may provide some or all of the following:

a common pilot symbol for up to two transmit antennas any number of dedicated pilot symbols in any allocated resource unit. (unit of time, frequency, spreading code)

an additional common pilot symbol per large number of subframes to enable feedback information concerning more than two transmit antennas Further, embodiments of the invention provide pilot sequences, which exploit sparse frequency bins (or sub-carriers) of the time domain (TD) pilot symbol. These sequences are orthogonal in the frequency domain (FD) for transmit antennas of the same sector i.e. (geographic) cell of a wireless network. These pilot sequences have good cross-correlation properties in all phase shifts in the full set of codes.

As a general proposition, embodiments of the invention are most advantageous when based on a time division multiplexed pilot structure, as opposed to frequency- or code-division multiplexed pilot structures and staggered structures, which are the focus of other OFDM research efforts. However, some embodiments may use the present invention in the context of frequency division multiplexed and/or staggered pilot structure as well. As will be shown below, the inventors have concluded that a TD pilot out-performs the frequency- or code-division pilot techniques, and performs equally well as the staggered pilot technique. Comparative data described below is for a multi-carrier signal, which benefits from having orthogonal sub-carriers in frequency. It is surmised that similar comparative results will yield for a single-carrier signal.

Figure 1B:
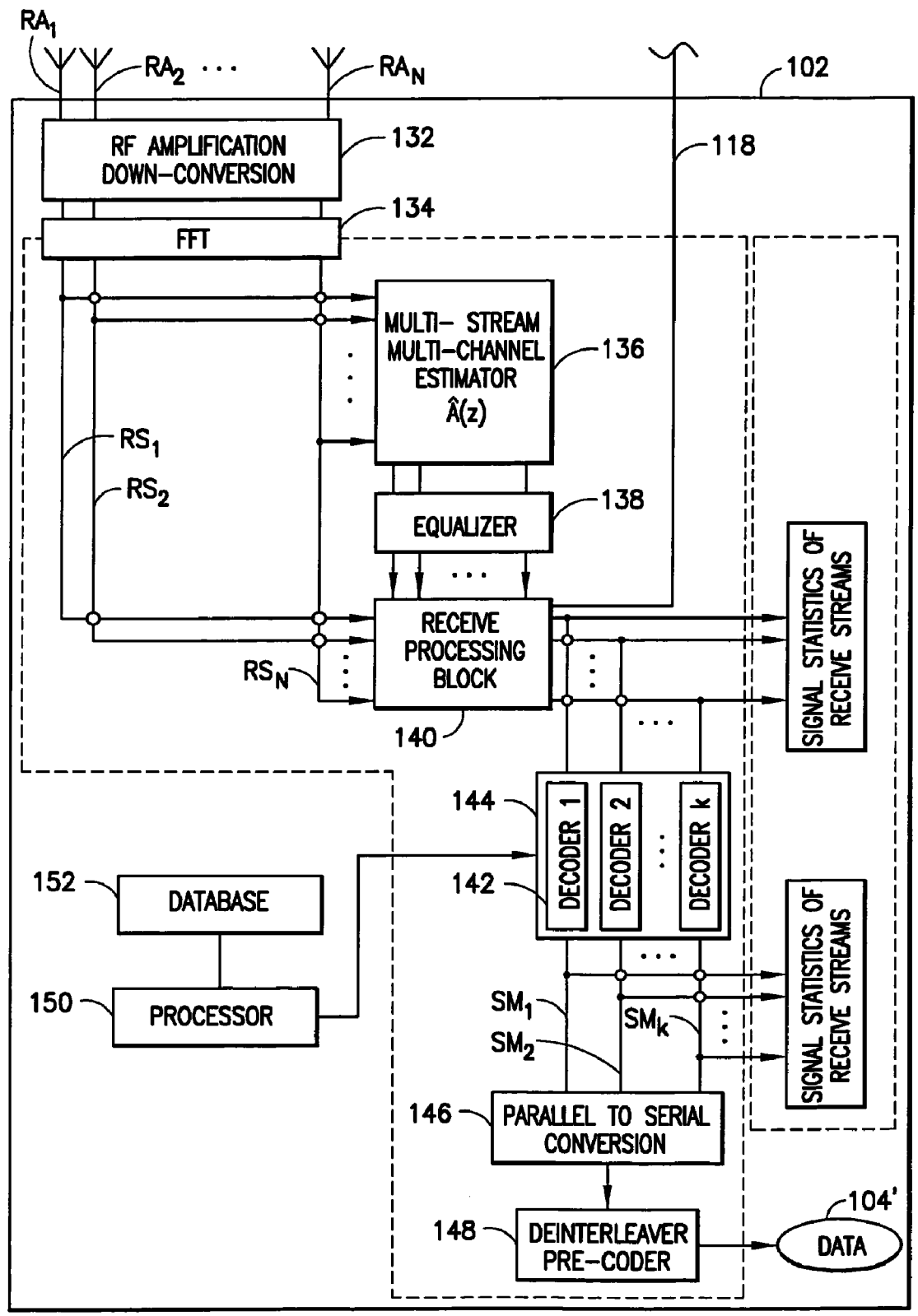

Reference is made to FIGS. 1A-1B, which are simplified block diagrams of a representative transmitter 100 (e.g., base station) and receiver 102 (e.g., mobile station) respectively that may be used to implement the invention. In FIG. 1A, data, such as received from another source (such as the Internet or a calling mobile station) and relayed through the receiver terminal, enters in the upper left at block 104. The data are processed through an interleaver-pre-coder 106 that fits the incoming bits into time slots, and serial to parallel converter 108 that assembles sequential streams of bits into blocks $SM_1$, $SM_2$, $SM_k$ that are to be processed in parallel fashion. It is these time slots where the inventive pilot sequences are disposed.

Encoder block 110 contains a set of coders 112 that map the blocks of bits into symbols $CS_1$, $CS_2$, ... $CS_k$ selected from a symbol constellation by a mapping that has been specified by the system designer. At the lower left of FIG. 1A, database 114 contains various stored items, such as the symbols in the symbol constellation in use, and the structure of where in a transmission frame the pilot sequences of the present invention are to be disposed.

At the lower center, controller 116 selects various stored items from the database 114 in response to feedback 118, illustratively coming along line 120 representing a wireless feedback channel from the party to which the data 104 is to be sent. For example, the transmitter 100 may be in a base station of a cellular or wireless network and the feedback may be coming from the various mobile stations 102 that are in communication with the base station 100, containing data on the quality of transmission of the various subchannels. For multiantenna transmissions, this feedback 118 shall be given for multiple transmit antennas. Alternatively or additionally, some channel quality feedback may be measured by the transceiver 100 itself as shown at block 122.

When one of the channels used to carry packets of a particular call or a data session is suffering from interference or fading propagation conditions, the controller(s) 116, 116' may make an adjustment to a transmission parameter to improve the transmission along that channel, e.g. by increasing the power on that channel and decreasing the power on another channel that has adequate signal quality to maintain the average power within limits, or to schedule the resource unit to different time and frequency, or to add time-, frequency- or multiantenna diversity to the transmission. The term 'resource unit' refers to a specific number of time/frequency/subcarrier/code resources that can be allocated to a specific user. Typically, when a network 100 informs a user 102 of the specific resources that are reserved for him/her, the network 100 also signals a transport format to be used on those resources as well. In accordance with the teachings herein, the transmitter 100 may adaptively add dedicated pilot sequences to enable the receiver terminal to maintain high quality channel estimation in a fading or interfered channel. Further, in accordance with these teachings, the transmitter 100 adds common pilot sequences to fixed locations within transmission frames and subframes by which the receiver terminal acquires the channel. The receiver terminal 102 may use both the common and dedicated pilot sequences to maintain the channel, but the placement of dedicated pilots within a frame depends largely from the feedback 118, 122.

The output of the encoder block 110 passes through an inverse fast Fourier transform block 124 to transform domain unit 126, which reformats the separate data streams as necessary and passes them to units 128 and 130. The matrix modulation block 128 modulates for transmission from the multiple transmit antennas, and the up-conversion block 130 modulates carriers, amplifies the signals, and up-converts the frequencies, finally sending the RF output to the set of antennas $TA_1$ - - - $TA_M$. The below detailed description provides examples for up to four transmission antennas, but more may be employed by simple extension of the principles detailed herein.

FIG. 1B shows a receiver terminal 102, which represents the recipient of the data sent by the transmitter of FIG. 1A. The signals are received on antennas $RA_1$ - - - $RA_N$, pass through an amplifier/down-converter 132 that amplifies the RF signals and performs a frequency down-conversion. The output of the amplifier/down-converter 132 is fast Fourier transformed at block 134. The signals are examined by a channel estimator 136, which performs a channel estimation by any convenient method (many are known in the art), and passes to an equalizer 138 that equalizes the estimated channels. The estimated channel parameters are used at the receive processing block 140 to demodulate and reconstruct the stream of signals that were transmitted and received.

A set of decoders 142 in decoding block 144 then apply the reverse of the coding process performed in the transmitter. The output passes through a parallel to serial converter 146 and a deinterleaver 148 to result in a stream of serial bits that reconstitutes a reasonable reconstruction of the original data. The receiver 102 of FIG. 1B further has a transmitter for providing feedback 118 to the original transmitter of FIG. 1A, as described above. This feedback 118 derives at least in part from the estimated channel parameters. The accuracy of the channel estimation impacts the demodulation quality and probability of correct decoding of the information block.

Both the transmitter of FIG. 1A and the receiver of FIG. 1B include a digital processor 116, 116', 150 for reading programs and data from the database 114, 152 related to general signal processing and to processing the pilot sequences in accordance with these teachings. At least the databases or local storages 114, 152 include computer program instructions that, when executed by the associated processor 116, 116', 150 enable them to operate in accordance with the exemplary embodiments of this invention, as will be discussed below in greater detail.

In general, the various embodiments of the transmitter 100 of FIG. 1A and the receiver 102 of FIG. 1B can include, but are not limited to, cellular phones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions. The transmitter that receives feedback may further be non-mobile, such as a base station or other network element of a wireless network.

The embodiments of this invention may be implemented by computer software executable by the digital processor of the transmitter and receiver of FIGS. 1A-1B, or by hardware, or by a combination of software and hardware.

The databases 114, 152 may be any computer readable medium for storing data and instructions, and may be of any type suitable to the local technical environment and may be implemented using any suitable data storage technology, such as semiconductor-based memory devices, magnetic memory devices and systems, optical memory devices and systems, fixed memory and removable memory. The digital processors may be of any type suitable to the local technical environment, and may include one or more of general purpose computers, special purpose computers, microprocessors, application specific ICs (ASICs) digital signal processors (DSPs) and processors based on a multi-core processor architecture, as non-limiting examples.

Following is a discussion of the particular inventive pilot symbol structure. Because the coherence bandwidth in E-UTRA is much larger than the sub-carrier bandwidth, the inventors consider it inefficient to always place a pilot symbol in every sub-carrier. Instead, they employ a regular pattern of pilot symbol placement [e.g., once per $8^{th}$ (120 kHz) sub-carrier], where the regularity is sufficient for the receiver to make an accurate frequency estimate of the channel.

The inventors have also determined that the channel coherence time is typically longer than the sub-frame length (e.g., 0.5 milliseconds or 1 ms). Therefore, pilot sequences more frequent than the coherence interval are unnecessary, and one pilot sequence (which may or may not occupy an entire symbol) per sub-frame enables reliable channel estimation for most situations. To address exceptions to this general proposition, such as high Doppler channels with shorter coherence times, it is possible to make a two-dimensional filtering over pilots in the previous sub-frame to the next sub-frame, which provides sufficiently accurate channel estimation even for those channels with a coherence interval somewhat less than a sub-frame. For the needs of possible very fast moving users, additional dedicated pilots may be used. Regardless of coherence interval, embodiments of the present invention may deploy a pilot sequence in every subframe, as the discontinuous transmission/reception and measurements require that a pilot sequence is readily available at least once in every sub-frame, so that any terminal that needs a channel estimate has the pilot readily available.

Figure 2:
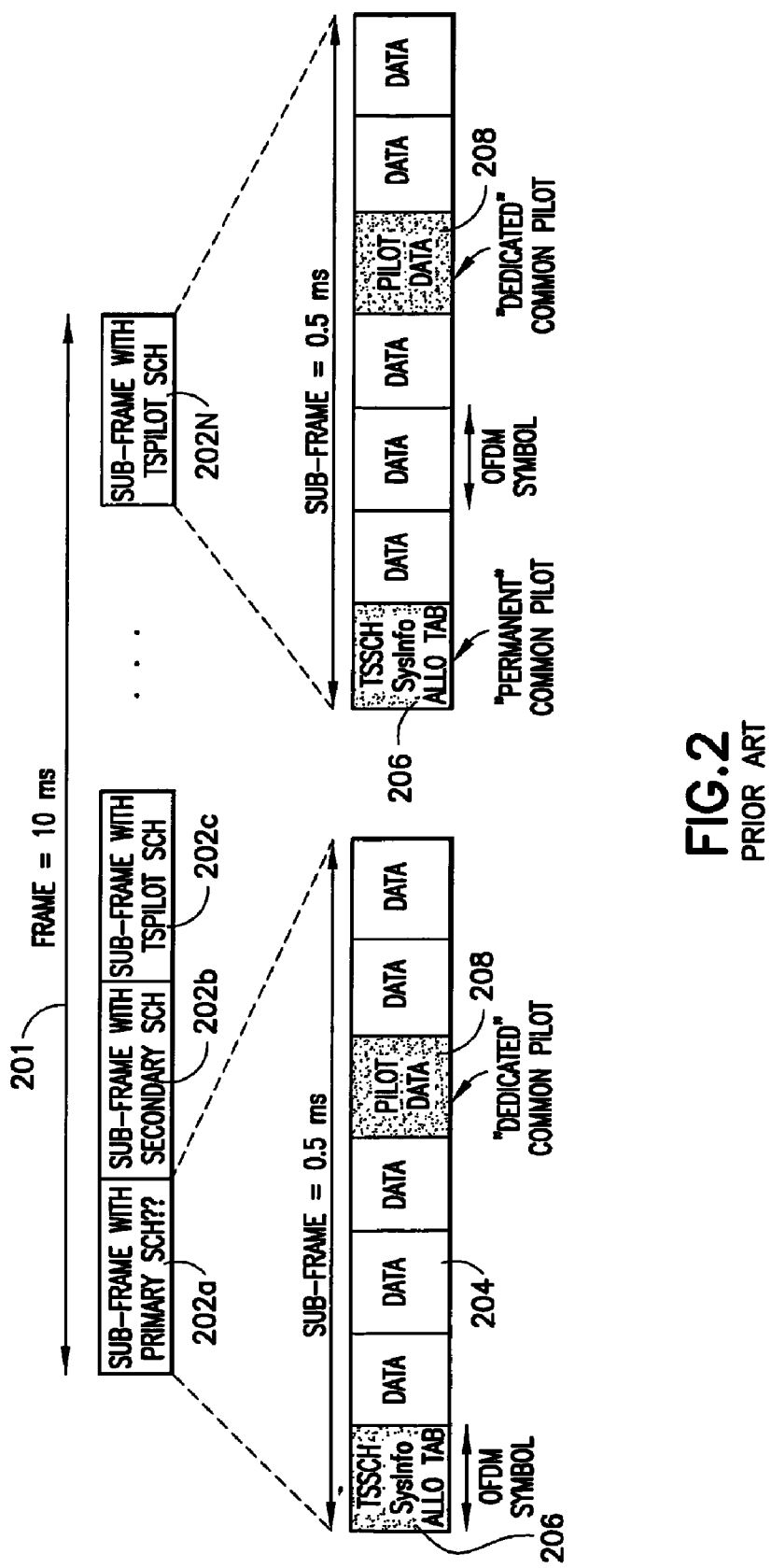
FIG. 2 is a prior art schematic diagram of a frame/subframe structure and pilot symbol disposition.

To illustrate the frame/sub-frame structure, FIG. 2 presents a prior art proposal for pilot symbols in an E-UTRA frame structure. One frame 201, extending 10 ms, includes a number N of subframes 202a, 202b, ... 202N. Each subframe 202 is divided into OFDM symbols, some of which represent data 204 or payload. In the proposed solution of FIG. 2, a training sequence (abbreviated SCH 206), common pilot sequence and an allocation table are multiplexed to the first time domain symbol of each subframe 202. Additionally, any subframe 202a-N may carry a dedicated common pilot sequence 208, which is added by the transmitter to every subframe, if multiple transmit antennas are intended to be in use, in beamforming adaptations, and for transmissions to fast-moving mobile stations (which generally exhibit reduced coherence intervals). The SCH 206 allows synchronization and the dedicated common pilot symbols 208 enable channel estimation for any of the subcarriers in use for that channel between transmitter and receiver; they are 'common' to those subcarriers.

As a modification to the arrangement shown in FIG. 2, an embodiment of this invention disposes a dedicated common pilot symbol on the $4^{th}$ symbol of the subframe, instead of the $5^{th}$ symbol of the subframe as in FIG. 2, because it leads to more smooth channel estimation in both subframe structures, such as those shown in 3GPP TR 25.814 (ver 1.2); i.e. the subframe with 7 symbols per subframe (unicast) and the subframe with 6 symbols per subframe (unicast in large cells or MBMS). However, this does not represent the only advance of the present invention.

As another modification to the prior art, embodiments of this invention propose that the training sequence for synchronization is not included to the first time domain symbol with the pilot sequence, but the pilot sequence itself is designed such that it can be used as the training sequence as well.

Figure 3A:
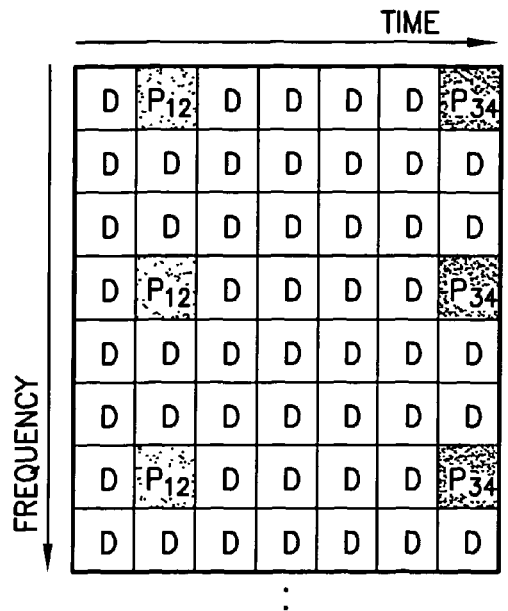
FIGS. 3A-3C illustrate pilot sequence placement according to the proposed solution of the SUTRA DOWNLINK PILOT REQUIREMENTS AND DESIGN reference.
Figure 3B:
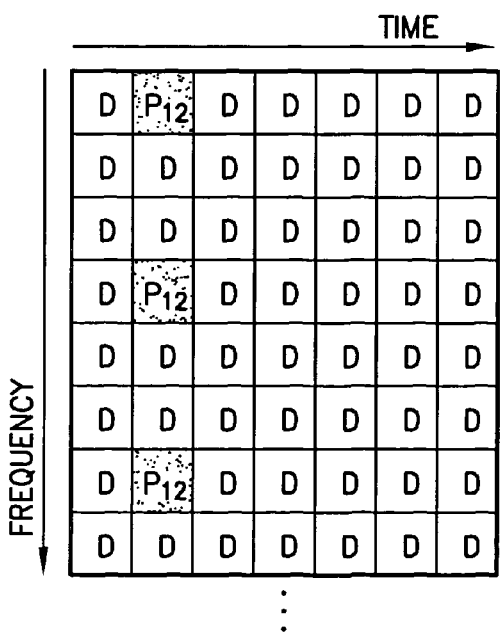
Figure 3C:
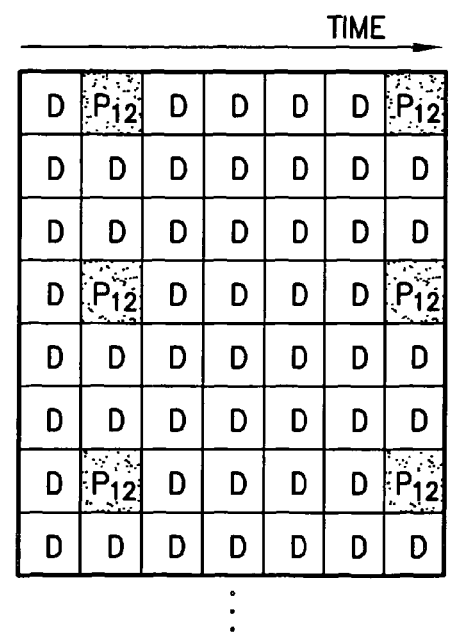

FIGS. 3A-3C show a different prior art solution for a pilot symbol structure, as described at the EUTRA DOWNLINK PILOT REQUIREMENTS AND DESIGN reference noted in the background section. Each of those figures represent one subframe, where each row represents a subcarrier or frequency bin and each column represents a symbol time within the subframe. Depending on the multicarrier transmission system in question and depending on its selected operational bandwidth, it is typical that the number of subcarriers (frequency bins) reach from at least 50 subcarriers to several hundreds of subcarriers, even up to over a thousand of subcarriers (e.g. at 20 MHz bandwidth). As an initial matter, the EUTRA DOWNLINK PILOT REQUIREMENTS AND DESIGN document references a prior document that transmits a pilot sequence in the second symbol of every subframe, and only on one of every two subcarriers. This leads to a 7.14% overhead cost for pilot symbols (1pilot/2carriers*7symbols). The same pilot sequence is transmitted from all subcarriers and all antennas, but with a phase shift to allow channel estimation. As shown in equation (1) of the EUTRA DOWNLINK PILOT REQUIREMENTS AND DESIGN reference:

$$s_m(k) = x(k)e^{-j2\pi k(m-1)/P}$$

where $x(k)$ is the sector specific pilot sequence, m represents the transmit antenna, and k represents the subcarrier.

FIG. 3A represents a proposal for pilot sequences in a four transmit antenna scenario. A pilot sequence for the first and second transmit antennas, designated in FIGS. 3A-3C as $P_{12}$, is transmitted in the second symbol in one of every three subcarriers. A pilot sequence for the third and fourth transmit antennas, designated in FIG. 3A as $P_{34}$, is always transmitted in the last (seventh) symbol in one of every three subcarriers, those same subcarriers carrying the pilot sequence for the first and second transmit antennas $P_{12}$. This leads to a 9.52% overhead for pilots [2/(3*7)].

FIGS. 3B-3C illustrate different proposals from the EUTRA DOWNLINK PILOT REQUIREMENTS AND DESIGN document for a two-antenna environment. In FIG. 3B, the overhead is reduced by half as compared to FIG. 3A because the pilot sequences for antennas 3 and 4 are merely eliminated, and those slots may then be used for data. In FIG. 3C, the number of pilots for the first and second antenna is doubled as compared to FIG. 3A or 3B by replacing the third and fourth antenna pilots $P_{34}$ of FIG. 3A with additional pilots for the first and second antennas $P_{12}$. Pilot overhead for these two-antenna solutions is then 4.76% for FIG. 3B, and 9.52% for FIG. 3C. Such alternatives in pilot structures actually need to be signaled in a common signaling channel (e.g. as the System Information channel) whose decoding is possible using default pilot structures only. As compared to the prior document EUTRA DOWNLINK PILOT REQUIREMENTS AND DESIGN, changing from every second to every third subcarrier fits better with the number of available subcarriers in 3GPP TR 25.814 (ver 1.2) ($2^n$*75+1), and reduces for the two-antenna scenario the pilot overhead by a factor of ⅓. For the four-antenna scenario of FIG. 3A (or for the multiple additional pilots for the two-antenna proposal of FIG. 3C), the pilot overhead of 9.52% strikes the inventors as a bit high for channel estimation and determination of channel quality. Exemplary embodiments of the present invention enable a reduction in that overhead for the four-antenna scenario (as well as a two-transmit antenna scenario) by providing for both common and dedicated pilots in the pilot structure.

Figure 4A:
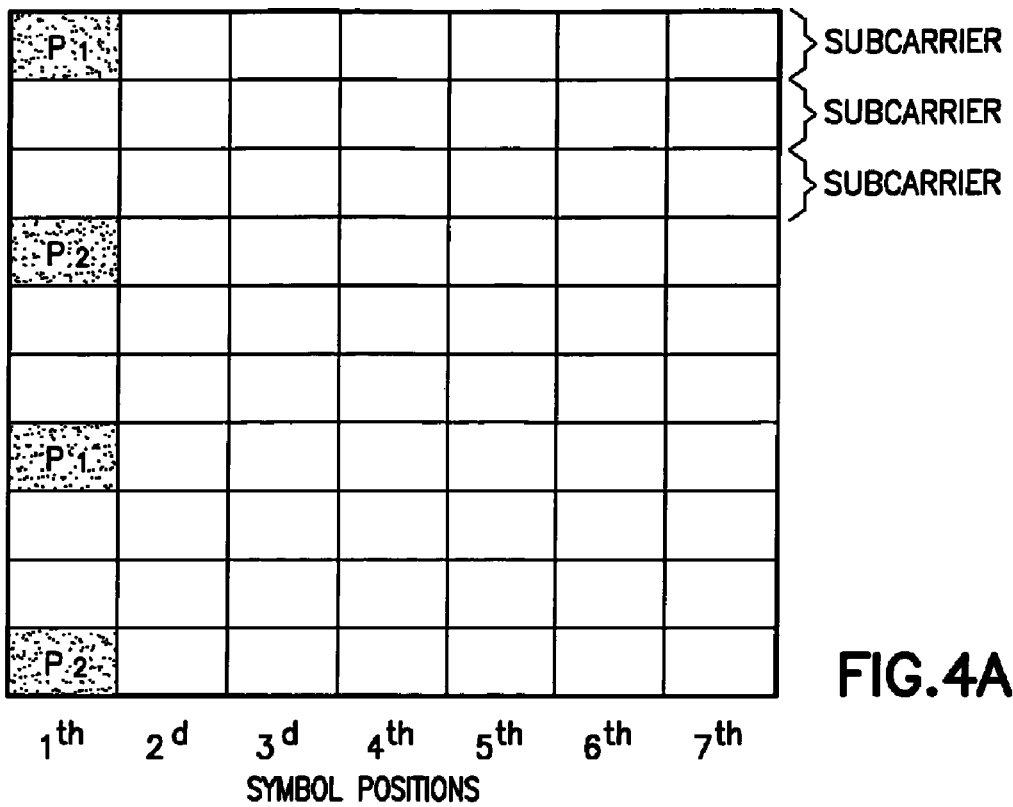
FIGS. 4A-4B illustrate two variations of common pilot sequence placement according to embodiments of the invention, for a two-transmit antenna environment.
Figure 4B:
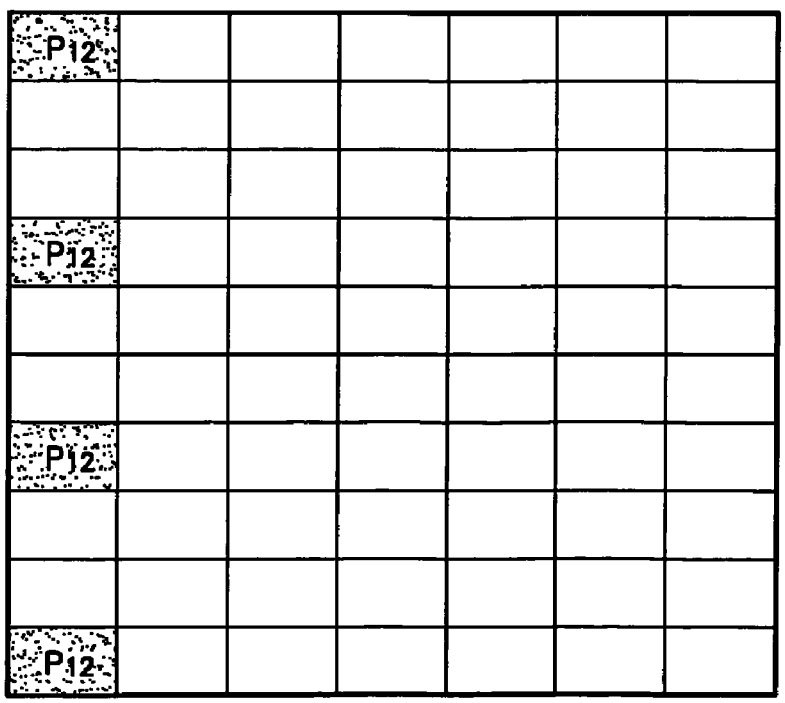

Designing the frequency bins for the pilot sequences is largely dependent on the number of transmit antennas. Exemplary embodiments of the present invention adapted to a two-transmit antenna scenario are described first, as illustrated at FIGS. 4A-4B. In these embodiments, the first primary common pilot sequence contains symbols for only a maximum of two transmit antennas. This enables equally efficient and accurate channel estimation for one and two transmit antenna schemes, and there is no preference to one scheme over the other. This yields a pilot overhead of 4.76%, which can be reduced to 3.57% if the pilot sequence were disposed only in the first symbol of every fourth subcarrier, rather than every third. As the orthogonality of pilots transmitted from the antennas of the same sector has to be guaranteed in order to avoid co-channel interference, in one embodiment these two antenna pilot sequences are frequency domain multiplexed to different subcarriers, which can also be considered as different frequency bins. This is illustrated at FIG. 4A, wherein $P_1$ is the pilot sequence for the first transmit antenna, $P_2$ is the pilot sequence for the second transmit antenna, and they rotate to lie in the first symbol (the zero$^{th}$ symbol position using the nomenclature of the EUTRA DOWNLINK PILOT REQUIREMENTS AND DESIGN document) of every third subcarrier. Of course, the regularity of the common pilot sequences can occur among any 1/N repetition of subcarriers; the inventors consider once per three or four subcarriers (for two transmit antennas this yields once per six or eight subcarriers for each transmit antenna) as optimum or near optimum for estimating the channel to meet QoS requirements under typical conditions of channel fading and interference using minimal pilot overhead. Such alternatives, as given here, may apply to different transmission systems, but for any selected transmission system these numbers are not expected to be left as open variables, but rather a defined pattern shall be written to the standard specifications. The reasoning is that every mobile terminal in any conditions need to be able to know, a-priori, what kind of pilot sequences are available and where they are in the frame structure.

In another embodiment shown in FIG. 4B, the two antenna pilot sequences may be multiplexed to the same sub-carrier. Pilot sequences for the first and second transmit antennas, $P_{12}$, are multiplexed in the first symbol of every third subcarrier. A one-transmit antenna scenario would be similar to FIG. 4A, but where all of the common pilot sequences are for the first (and only) transmit antenna $P_1$, so pilot sequences for the sole antenna occur in the first symbol slot of each subframe for every third subcarrier. Unlike the proposal of FIG. 3C, pilots may only be in the first symbol position as illustrated in FIGS. 4A-4B. These common pilot sequences may instead be placed in the second, third, or any other pre-arranged symbol time, as certain advantages of the present invention are realized also in the dedicated pilot sequences to be described below with reference to FIG. 6. Those dedicated pilots address channel coherence problems for fast fading channels. Where coherence interval is only slightly less than a subframe length, the common pilot symbols already detailed may be filtered by the receiver over multiple subframes as noted above. This avoids increasing signalling overhead by the use of additional dedicated pilots for that particular channel condition.

Considering the embodiment of FIG. 4B, the two antenna pilot sequences $P_{12}$ must allow separate and non-correlated channel estimation for both antennas. Such a scheme is possible by proper phase modulation of the symbols bearing the pilot sequences. Multicarrier systems generally employ chronologically long symbols (on the order of 10 to 100 microseconds) and the concern for phase accuracy is not as severe as for single carrier systems that employ much shorter symbols (on the order of 260-30 nanoseconds).

Figures 5A, 5B, 5C:
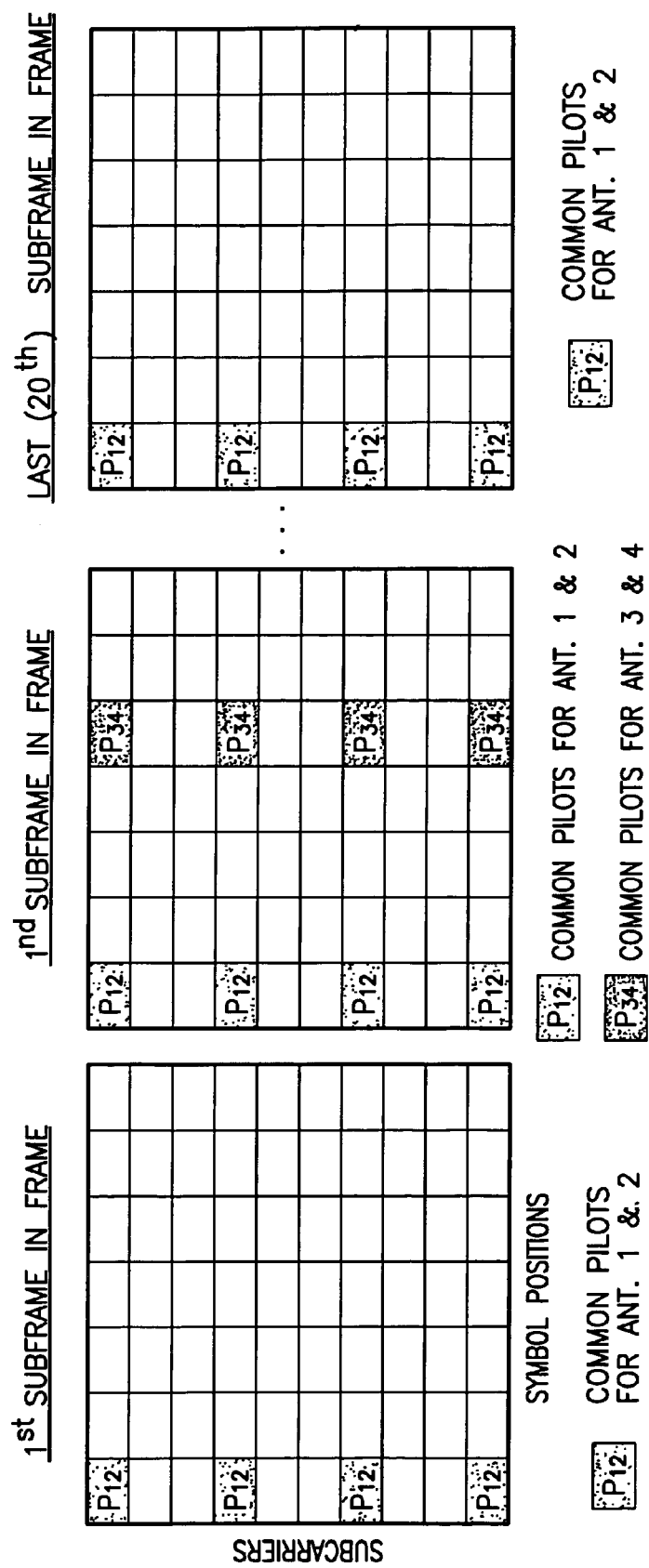
FIGS. 5A-5C illustrate representative subframes of a frame showing common pilot sequence placement for a two or four transmit antenna environment.

A four-antenna solution for pilot sequence disposition is shown in FIGS. 5A-5C, which represent respectively the first, second, and last subframe of a frame. Note that the terminology for first, second, etc. for subframes is exemplary and not limiting. The first subframe of FIG. 5A is identical to that of FIG. 4B: pilot sequences for the first and second transmit antenna are multiplexed to the same subcarrier, and lie in the first symbol of every third subcarrier.

In the second subframe of FIG. 5B, the pilot sequence regimen of FIG. 5A is repeated, but in addition, pilot sequences for the third and fourth antennas $P_{34}$ are multiplexed in a different time-symbol position than $P_{12}$. $P_{34}$ is used for channel quality estimation and for the decision feedback, whether to adopt a four-antenna transmission scheme. The feedback further allows allocation and scheduling decisions for transmissions that use antennas 3 and 4. Without these additional pilot sequences $P_{34}$ for antennas 3 and 4, it would not be simple to make such feedback available for any transmission scheme including antennas 3 and 4.

These same third and fourth antenna pilot sequences $P_{34}$ can be used by the receiver for decoding a four-antenna transmission received in the first subframe of FIG. 5A, and for subsequent subframes of the frame, constrained of course by the coherence interval. If the coherence interval is fairly long (e.g., several subframes or even a frame), then the pilot sequences $P_{34}$ in one or a few subframes of a frame will be sufficient. If the coherence interval is too short for the receiver to estimate channels from the third and fourth transmit antennas using only those additional common pilot sequences $P_{34}$ in the second subframe, then the transmitter can revert to a two-antenna transmission scheme, or can support a four-antenna transmission scheme by the approach of FIG. 6 which adds dedicated pilots.

The last subframe of FIG. 5C is identical to the first subframe shown in FIG. 5A; only common pilot sequences of the first and second transmit antennas $P_{12}$ are used, and they are in the first symbol position of every third subcarrier. The third and fourth common pilot sequences $P_{34}$ are only present in some of the subframes, not all subframes and preferably only in one or two subframes of a frame. Where $P_{34}$ is present only in one subframe as in FIGS. 5A-5C, the total pilot overhead is about 5%, only marginally more than that for the two-antenna solution of FIGS. 4A-4B (3.6 to 4.7%), in order to make the decision whether to apply transmissions from antennas 3 and 4, as well. This is also sufficient for the feedback of transport format selection and scheduling decisions.

All of the pilot sequences detailed to this point are common pilots, and their placement in the frame is fixed. The receiver knows to expect a common pilot for the first and second transmit antenna $P_{12}$ in the first symbol of every third subcarrier during every subframe, and to expect a common pilot for the third and fourth transmit antenna $P_{34}$ in the fifth symbol of every third subcarrier only in the second subframe, to give the illustrated example. Below and with reference to FIG. 6 details using dedicated pilot sequences for the third and fourth transmit antennas to address the situation where the common pilot sequence $P_{34}$ in only one subframe per frame is insufficient for reliable channel estimation in the receiver.

If one pilot has to appear in $1/8^{th}$ of the subcarriers, multiplexing two antennas in frequency will occupy $1/4^{th}$ of the subcarriers. Further, the separation of three sectors, or (geographic) cells of a wireless network, is needed with low cross-correlating or orthogonal sequences. This is so that channel estimation of different sectors, especially at the border of those sectors, does not suffer from excessive interference. Such pilot sequences with low cross correlation, when transmitted with the same phase reference, can easily be designed. In fact, the design for low cross correlation among three sectors allows any number of sectors, as there is always at most only three sectors that a single point in space can straddle, given current network sectorization (e.g., hexagonal sectors, irregular sectors to minimize multiple borders, etc.).

The design of pilot sequences between sectors of a network (e.g., different base stations) can be done by creating sequences with sufficient cross-correlation protection between any two codes of the full set of pilot sequence codes. Here, the cross-correlation has to be low in all phase shifts, as there is currently no common phase reference between signals transmitted from different base stations. This may imply the selection of long spreading or scrambling codes. However, the preference is to design special code sequences, which are known to have good cross-correlation properties in all phase shifts (instead of using long spreading or scrambling codes). A particularly efficient method to introduce good cross-correlation properties between pilot sequences transmitted in different sectors of a network is to use pilots that are orthogonal in frequency or time. In accord with an aspect of the invention, where common pilot sequences are transmitted from two antennas per sector, common pilot sequence transmissions from a three-sector base station can be orthogonalized in the frequency by transmitting a pilot sequence from one antenna on every sixth subcarrier, and using different subcarriers for different antennas and sectors. If any soft-reuse or power sequence design is in use, the pilot sequences transmitted from each base station can be placed to those frequency bins where the allocated power is the highest. If such a method is not in use, the pilot sequences of neighboring base stations can be created by a known (or random) starting phase of a sub-carrier index.

The above considerations tend to lead to the design of pilot sequences as considered from the point of view of individual base stations. As the resource allocations of every sub-frame need to be indicated, preferably in the first TD symbol as described above (or possibly within the first two symbols), the allocation indications are multiplexed together with the pilot sequence in the first TD symbol. To accommodate any decent number of allocation indications to the first TD symbol then, according to embodiments of this invention, pilot sequences of up to two transmit antennas are present in this first TD symbol of the frame.

Embodiments of this invention solve the problem of the occasional need for additional pilot sequences, so that any resource unit may contain additional, dedicated pilot symbols inside the allocated resource unit itself. These additional, dedicated pilots may serve single or two antenna transmissions for ultra-high velocity receiver terminals, may serve beamforming transmission from any number of transmit antennas to a receiver terminal, and may serve multi-stream and/or diversity transmissions from any number of transmit antennas to a receiver terminal. This is the most flexible solution, as the pilot symbols are then present in exactly those frequency bins at those times where the resource allocation is present. Further, the pilot symbols may be present to all those receivers that need it for channel estimation or decoding their resources, but need not be present to any terminal, whose channel estimation accuracy can already be obtained by filtering solely the common pilot sequences (e.g., filtering among subframes as noted above). The benefit of this adaptive approach is also that the amount of dedicated pilot sequences per resource allocation can be exactly tailored depending on how much increased accuracy is required in addition to the common pilot. This consideration can of course take into account the specific transport format selected for the resource unit in question. Such transport format typically includes at least subcarrier modulation (BPSK, QPSK, 16QAM, 64QAM).

Even working optimally, the common pilots alone are insufficient because they do not support the receiver measuring and informing the transmitter for which resource units to allocate to which terminal and which transport format to apply for each allocation to each terminal for more than two transmit antennas. Given only the pilot sequences of FIGS. 4A-4B, such information is only available at the receiver for at most two transmit antennas, as only common pilot sequences $P_{12}$ for the first two transmit antennas are present over the full bandwidth during the first TD symbol. Embodiments of the invention occasionally allocate bins from a data symbol, say the fifth data symbol of an occasional subframe as in FIG. 5B, to common pilot sequences of any other transmit antennas apart from the first two antennas. These common pilot sequences (e.g., $P_{34}$), are present over the full bandwidth during that symbol period. The receivers are therefore enabled to measure the full channel information from these additional antennas (apart from the first and second), and may then inform the transmitter by feedback signalling when it is favorable to transmit from these (third and fourth) antennas to this particular receiver, as well as the most efficient format and most favorable frequency bins in which to place the resources. As the allocated resources will have dedicated pilots, this additional common pilot $P_{34}$ as shown in FIG. 5B need not be accurate enough for channel estimation, but it needs to be accurate enough for giving the necessary channel quality feedback.

The benefit of such an additional common pilot $P_{34}$ is that it can appear commonly for all the receiver terminals, which measure and create feedback regarding the third and fourth transmit antennas only when necessary. Absent a positive feedback from a receiver, the base station transmitter remains on a up-to two-antenna transmission for that receiver. The other benefit is that the additional common pilots $P_{34}$ need not be available in every sub-frame, but can appear much less frequently, such as once per frame as detailed with respect to FIGS. 5A-5C. The channel coherence time is typically long compared to the sub-frame and is especially long for expected multi-stream multi-antenna transmissions, which are feasible in low velocity channels, so the feedback of channel quality information or even the feedback of full eigen matrix of the channels need not be very frequent. If any inaccuracy is created to the selection of transport format, those inaccuracies do not concretely weaken the quality of the actual channel estimation, demodulation and decoding, which are done from the dedicated pilots present exactly inside the allocated resource. Thus, the probability of inaccurate feedback is not large and especially its impact to the actual demodulation and decoding process is even smaller.

Staggering pilots have also been proposed and have been shown to perform well. Staggered structures include full staggering or staggering with small degrees of staggering. All these proposals known to the inventors suffer from the characteristics that the staggered pilots are always present in every sub-frame. This causes significantly higher pilot overhead compared to the pilot regime disclosed herein. Further, scattering pilot symbols widely in frequency and time adds complexity to resource allocation algorithms, which after allocating and encoding the resources must apply puncturing of the payload symbols. It is in these same punctured positions, where the symbols of the staggered pilot sequences are present, resulting in increased pilot overhead with no benefit for those resource units allocated to terminals, for which the amount of pilot energy is already sufficient.

Figure 6:
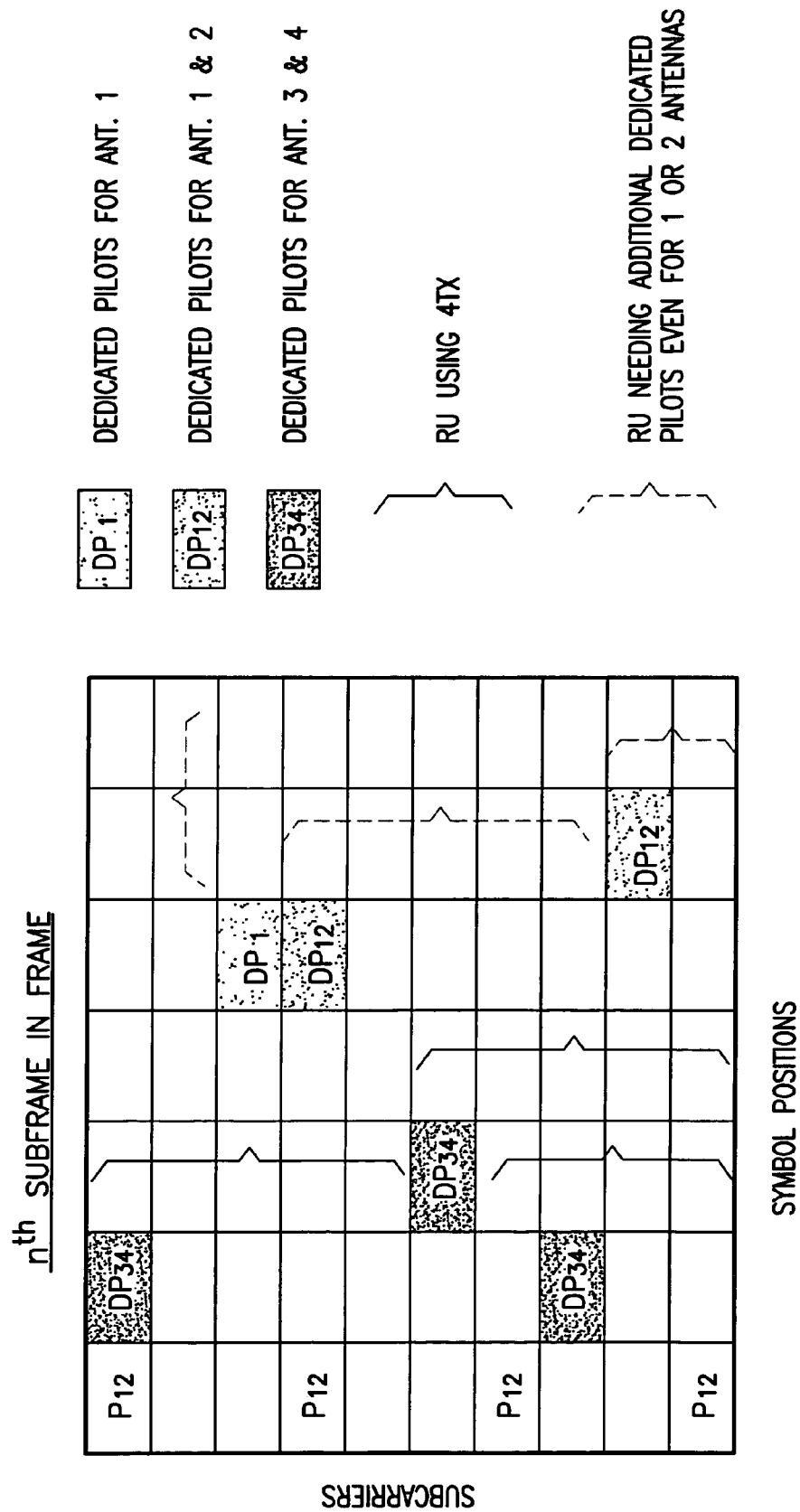
FIG. 6 illustrates a subframe showing placement of common pilot sequences and exemplary placement of dedicated pilot sequences in a four transmit antenna environment.

To address the issue where additional pilot sequences are needed for the third and fourth pilot sequences in addition to the common pilot $P_{34}$ shown in FIG. 5B (e.g., once per frame in every third subcarrier), or where the receiver needs additional pilot sequences even for the first and second transmit antennas over and above the one multiplexed sequence $P_{12}$ in the first symbol of each subframe on every third subcarrier, exemplary embodiments of this invention use what are termed dedicated pilot sequences DP. The dedicated pilot sequences may be for a single transmit antenna, or frequency multiplexed in the same manner as the common pilot sequences for up to two transmit antennas. The concept is shown in FIG. 6, which represents any subframe of a frame. Dedicated pilot sequences $DP_1$, $DP_2$ or $DP_{12}$ may be needed in any sub-frame for an ultra-high velocity terminal. Dedicated pilots $DP_{34}$ are only required in the subframes that do not contain additional common pilot sequences $P_{34}$ for the third and fourth transmit antennas. Dedicated pilot symbols DP are placed in any frequency subcarrier of any time-symbol inside the allocated resource unit of a subframe.

Specifically, FIG. 6 shows a dedicated pilot $DP_1$ for the first transmit antenna in the fifth symbol position of the third subcarrier, and dedicated pilot sequences for the first and second transmit antennas $DP_{12}$ in the fifth symbol of the fourth subcarrier as well as the sixth symbol of the ninth subcarrier (counting subcarriers from top to bottom). FIG. 6 further illustrates dedicated pilot sequences for the third and fourth transmit antennas $DP_{34}$ in the second symbol of the first and eighth subcarriers as well as the third symbol of the sixth subcarrier. FIG. 6 here shows some possible arrangements of dedicated pilot sequences in a single sub-frame, but it should be understood that any given DP structure in any given subframe is feasible.

Figure 7:
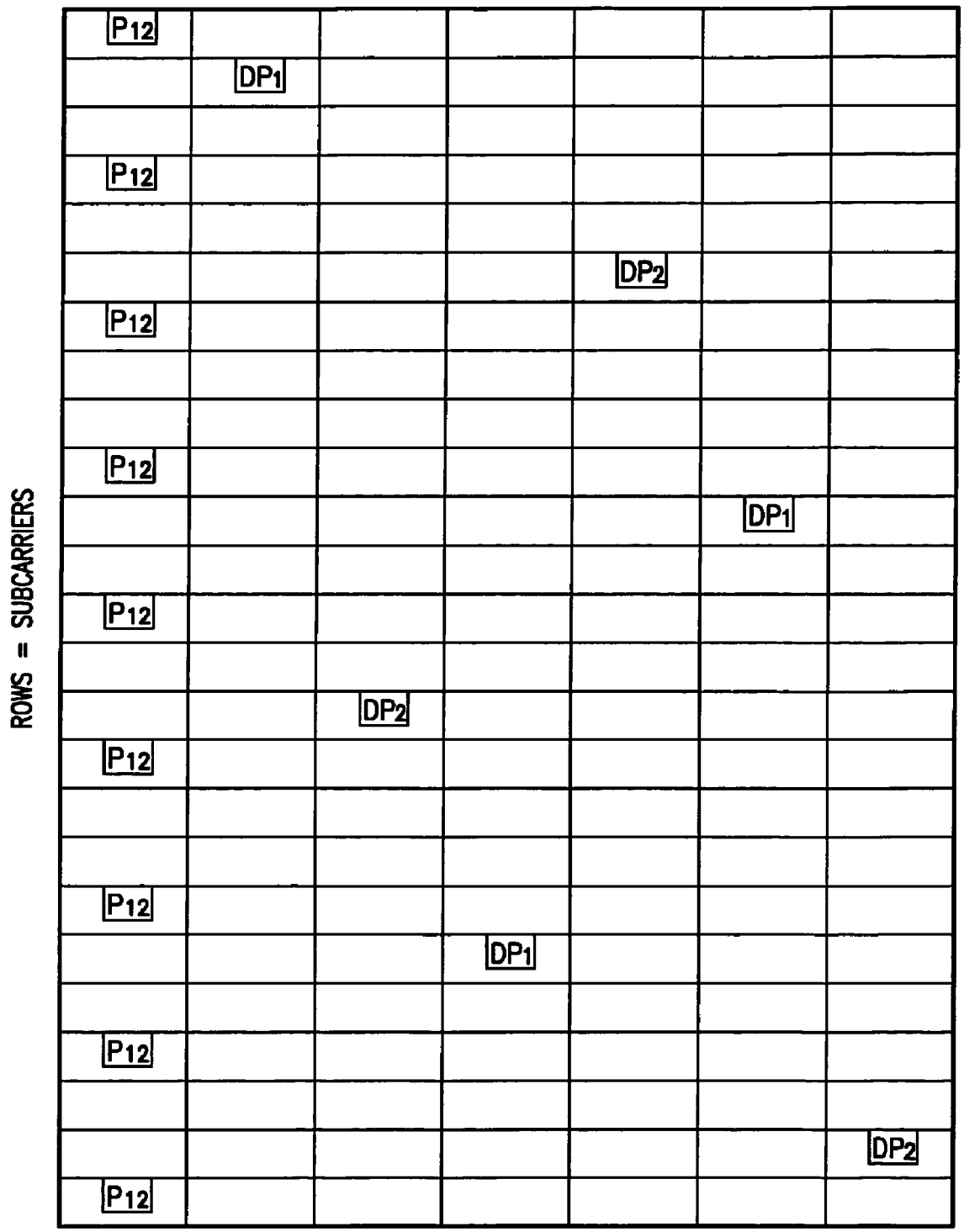
FIG. 7 is similar to FIG. 6, but illustrating an alternate placement of pilots that may also be used in a four transmit antenna environment.

Another arrangement can be found in FIG. 7. There, a resource unit is assumed to consist of 25 subcarriers in the six symbols that do not carry common pilots (symbols 2-7). In such a resource unit, there are six possible places for dedicated pilots, as depicted in the FIG. 7. In this example, the six places are scattered onto different subcarriers, so that in each of the symbols 2-7, one subcarrier may be used to dedicated pilots. The possible dedicated pilots are divided into two sets, $DP_1$ and $DP_2$. If the dedicated pilots are used for channel estimation for antennas 3 and 4, the positions indicated by $DP_1$ may be used to transmit pilot sequences for antenna 3, and the positions indicated by $DP_2$ may be used to transmit pilot sequences for antenna 4. With such an arrangement, the density of pilot sequences that would be used to estimate the channel from antennas 3 and 4 would be smaller than the common channel pilot density that is used to estimate the transmission from antennas 1 and 2, especially taking into account that for antennas 1 and 2, one may always take into account the common pilot channels from the next sub-frame. To compensate for this, the power of the dedicated pilots may be changed. Such a pilot offset means that the transmission power used on data subcarriers during symbols 2-7 may be slightly reduced, and correspondingly the power on DP would be increased. If the dedicated pilots are used for a high Doppler user with a two-antenna transmission, $DP_1$ may be used for antenna 1, $DP_2$ for antenna 2. No pilot power offset may be needed in such a case. If the dedicated pilots are used to transmit a dedicated pilot from a single beam, both $DP_1$ and $DP_2$ would be used, possibly with a pilot phase or power offset. If two beams are simultaneously transmitted, dedicated pilots for beam 1 are transmitted on $DP_1$, and for beam two in $DP_2$, possibly with a pilot offset.

The placement of dedicated pilots in FIG. 7 has the advantage that after removing the DP subcarriers from symbols 2 to 7, what remains of the resource unit is a rectangular set of subcarriers and symbols. This eases processing as all symbols are processed in essentially the same manner. The DPs depicted in FIG. 7 are designed to be self-contained. Thus the distance from the upper- and lowermost subcarriers to the closest subcarrier with a DP is one, which is smaller than the largest distance from a subcarrier in the bulk to a subcarrier with DP (for example, from subcarrier 4, the distance to the closest subcarrier with DP is 2). This is due to the fact that interpolative channel estimation (which can be used on subcarriers that are between two DPs) is more accurate than extrapolative channel estimation (which has to be used on the edges).

For overall simplicity, it is advantageous that the placement of the dedicated pilots in a resource unit is the same, irrespectively of the use that the DPs are intended for. Thus, if DPs are in use, the receiver would demultiplex the DPs (e.g. the $DP_1$ and $DP_2$ in FIG. 7) and the data, and process them in a way that depends on their usage. The demultiplexing unit would thus be the same, irrespective of the use of the DPs. Also, for simplicity it is preferred that the usage of the DPs is as predefined as possible. Thus, together with a specified transport format, there would always be an associated DP usage. This would reduce signalling in that it is not needed to separately signal how the DPs are used. For example, if the transport format is a four-antenna transmission, dedicated pilots $DP_1$ and $DP_2$ would always be used as specified above, with a specified pilot offset. Similarly, with a beam forming solution, the DPs would be always used as specified above.

The overall scheme is as follows. The transmitter (base station) transmits the common pilot sequences P as shown in FIGS. 5A-5C, adding dedicated pilots DP for the first and second transmit antennas as needed. The receiver determines, from the common pilot sequences for the third and fourth antennas $P_{34}$ that are present only in a specific subframe in a radio frame, that the channel conditions favor a four-antenna transmission. The receiver feeds back to the transmitter the desire for it to move to a four-antenna transmission, along with advantageous transport format and frequency bins for the four-antenna transmission. That same feedback gives a channel quality indication to the transmitter, and possibly determines a coherence interval which it uses to place dedicated pilots DP for the various antennas in the proper slots so the receiver can maintain the channel for all transmit antennas. The transmitter then proceeds to transmit the allocated resource unit using all four antennas, interspersing the dedicated pilots DP for specific antennas as required by the selected transport format among the common pilots P that lie in the pre-arranged symbol and subcarrier slots. The receiver continues to provide feedback to the transmitter, and the dedicated pilots DP are interspersed as determined by that feedback for the antennas also determined by that feedback. The dedicated pilots DP may be adaptive in both antenna and placement within the frame, and responsive to channel quality measured by the receiver and fed back to the transmitter (or measured directly by the transmitter from the feedback link).

An advantageous scheme for DP disposition is to fix DP within each different transport format, with the same DP placement within subframes regardless of usage. In this manner, the DP scheme is adaptive in that DP placement differs for resource units intended for different users operating with different transport formats (and for the same user operating with a different transport format). The common pilots are not adaptive, but are fixed for antenna and frame position. Only the minimum number of dedicated pilots DP necessary for the receiver to maintain the channel are transmitted, so pilot overhead is at its minimum. Where conditions do not favor four-antenna transmissions, no dedicated pilots for those antennas are sent. Where conditions are favorable for minimal pilots, only the common pilot sequences P are sent.

The above embodiments can be seen as a time domain pilot structure, but equally well they can be seen as specific ways of creating staggered pilot structures. First, staggering is applied in frequency because all the frequency bins of a time domain symbol are not allocated to the common pilot sequence P. Secondly, the dedicated pilots are present in staggered positions of the sub-frame, but not in permanent or semi-permanent positions, but only according to the concrete channel estimation need of any payload. Third additional pilots for transmit antennas exceeding the first two are staggered. This staggering is again a time domain structure with frequency staggering so that only a minimally sufficient number of frequency bins are allocated to the pilot sequences. Further, this time domain symbol is staggered to every 1/Nth subframe only (N being the number of subframes in a frame). Having one time domain symbol allocated for a staggered additional common pilot $P_{34}$ has the benefit of supporting discontinuous transmission/reception. The mobile terminals will know a-priori, where this symbol with additional pilot sequences is located, so they can explicitly break the power-saving sleep mode to measure this symbol, if essential for their operation. If it would be a fully staggered pilot sequence (e.g., dedicated rather than common), the mobile terminal would have to stay active continuously to gather enough frequency samples over time for a proper feedback.

Exemplary embodiments of this invention take into consideration the limitations of mobile receivers/terminals that are available and now under final stages of development. Such mobile terminals do not generally have the capability of estimating more than two antennas. Embodiments of this invention account for that aspect in that the presence of the additional common pilot $P_{34}$ in the frame structure will not adversely impact those legacy receivers. Further, depending on the channel conditions of a receiving mobile terminal, it is not expected that all of them could exploit estimation of more than two transmit antennas. Also for those mobile terminals the presence of the additional common pilot $P_{34}$ in the frame structure will not adversely impact.

Advantages offered by the exemplary embodiments of the invention include the time domain structure of pilots, which makes processing pilots fast and deterministic. This enables terminals to switch off and on (discontinuous transmission/reception), when necessary. Other types of pilot structures known in the art mandate that mobile receivers/terminals remain active (not in sleep mode) for substantially longer times.

Another advantage, specifically designed for by the inventors, is that the minimum pilot overhead needed by embodiments of this invention is small, as illustrated at Table 1 below. By the above teachings, adding complexity and versatility to the transmission technologies does not imply added overhead in the frame structure, unless those techniques are actually used at a given time. All other pilot structure proposals known to the inventors add significantly more static overhead to the frame structure regardless of whether or not the multi-antenna transmissions are actively in use at the moment.

TABLE 1

Overhead calculation of the disclosed pilot structure.

| Freq bins per pilot | Pilot overhead for different number of TX antennas, and repetition factor | | | |
|---|---|---|---|---|
| | 1 TX | 2 TX | 4 TX/10 ms | 4 TX/5 ms |
| 1/8 | 1.79% | | 1.88% | 1.97% |
| 1/8 & 1/8 | | 3.57% | 3.74% | 3.92% |
| 1/3 | 4.76% | | 5.00% | 5.03% |
| 1/3 & 1/3 | | 9.52% | 9.97% | 10.47% |

Table 1 shows the common pilot overhead as a function of number of transmit (TX) antennas according to the embodiments detailed above. Antennas 1 and 2 are the common pilot sequences present in every sub-frame. For more than two transmit antennas, the common pilot overhead adds as a function of additional common pilot repetition, calculated here as once in 10 ms or once in 5 ms respectively. The calculation is shown for two example frequency bin allocations, which provide at least better than or equal to 120 kHz frequency resolution. The additional overhead for dedicated pilot sequences, potentially present in the payload, is not shown in Table 1, as their occurrence can be anything from zero up to several symbols (samples) per frame.

TABLE 2

Overhead calculation of a prior art scheme.

| Freq bins per pilot | Pilot overhead for different number of TX antennas | | |
|---|---|---|---|
| | 1 TX | 2 TX | 4 TX/0.5 ms |
| 1/8 | 1.79% | | 7.16% |
| 1/8 & 1/8 | | 3.57% | 7.14% |
| 1/3 | 4.76% | | 19.04% |
| 1/3 & 1/3 | | 9.52% | 19.04% |

Table 2 shows the pilot overhead as a function of number of transmit antennas, according to the proposal of the EUTRA DOWNLINK PILOT REQUIREMENTS AND DESIGN document. The lack of dedicated pilot symbols in the approach represented by Table 2 forces the pilot sequences of any number of antennas to repeat frequently, every sub-frame in this different proposal.

It is assumed that some cell deployments may not benefit by transmissions from more than two transmit antennas. In such instances, the additional common pilot is not necessary. Such information, whether or not the additional common pilot is in use in a given cell, can easily be incorporated to the System Information message. It is notable that the System Information message itself is currently not feasible to be transmitted from more than two antennas because all served mobile terminals in all conditions need to be able to decode it. Even if the additional common pilot were not present in the sub-frame structure, the dedicated pilots for antennas 1 and 2 are feasible for use with terminals currently in use.

Various modifications and adaptations may become apparent to those skilled in the relevant arts in view of the foregoing description, when read in conjunction with the accompanying drawings. As but some examples, the use of other similar or equivalent pilot schemes may be attempted by those skilled in the art. However, all such and similar modifications of the teachings of this invention will still fall within the scope of the non-limiting embodiments of this invention.

Furthermore, some of the features of the various non-limiting embodiments of this invention may be used to advantage without the corresponding use of other features. As such, the foregoing description should be considered as merely illustrative of the principles, teachings and exemplary embodiments of this invention, and not in limitation thereof.

In exemplary embodiments, the common pilot sequences are disposed as follows, where common pilot sequences refer to fixed locations (subcarrier and symbol position) within a frame. Common pilot symbols for at most two transmit antennas are disposed regularly within the frame (e.g., once in each subframe) in one of every N subcarriers, N preferably being three or four, or six or eight. Also, additional common pilot symbols for other transmit antennas are disposed less frequently, preferably once per frame, also in one of every N subcarriers. Dedicated pilot sequences for any transmit antenna, singly or in pairs of antennas, are then disposed in an adaptive manner based on the channel conditions and resource allocation in advantageous subcarriers, of which the receiver may signal in a feedback channel which subchannels would be advantageous. Dedicated pilot sequences do not occupy a permanent or semi-permanent position of subcarrier and symbol position in the frame. Both common pilot sequences from multiple antennas and dedicated pilot sequences from multiple antennas may be multiplexed to the same subcarrier and symbol slot, or they may be frequency multiplexed to different subcarriers.

We claim:
1. A method comprising:
arranging data for transmission in a frame structure, the frame structure comprising a series of subframes, each subframe comprising a plurality of frequency-divided sub-carriers, each sub-carrier comprising a plurality of time-divided symbol positions;
determining pilot sequences for aiding a receiver in estimating a channel comprising the sub-carriers over which the data is to be transmitted;
in each subframe, disposing a pilot sequence for a first transmit antenna in a first of the plurality of symbol positions only in every $(2*N)^{th}$ one of the sub-carriers, where N is equal to three or four;

in each subframe, disposing a pilot sequence for a second transmit antenna in the first symbol position only in every $(2*N)^{th}$ one of the sub-carriers, wherein the pilot sequences for the first transmit antenna that are in the first symbol position are in different sub-carriers than the pilot sequences for the second transmit antenna that are in the first symbol position, and wherein the subcarriers in which are disposed the pilot sequences for the first transmit antenna that are in the first symbol position are not adjacent to the subcarriers in which are disposed the pilot sequences for the second transmit antenna that are in the first symbol position; and transmitting the frame comprising the data and disposed pilot sequences over the channel from the first and the second transmit antennas.

2. The method of claim 1, further comprising disposing at least one further pilot sequence in a subframe in the third to last symbol position.

3. The method of claim 1, further comprising disposing at least one pilot sequence for a third or fourth transmit antenna in other than the first symbol position.

4. The method of claim 1, wherein the said pilot sequences for the respective first and second antennas are separated in at least one of frequency and phase from one another; the method further comprising disposing dedicated pilot sequences for at least one antenna other than the first and the second antenna.

5. The method of claim 4, wherein both a specific sub-carrier and a specific symbol position of at least one subframe of the frame in which the dedicated pilot sequences are disposed is based on a received indication of channel quality.

6. The method of claim 4, wherein the dedicated pilot sequences are disposed in the fourth and the seventh symbol positions of the at least one subframe.

7. The method of claim 1, further comprising:
in each subframe, disposing another pilot sequence for the first transmit antenna in another of the plurality of symbol positions, not adjacent to the first symbol position, in subcarriers other than those in which are disposed the pilot sequences for the first transmit antenna in the first symbol position; and
in each subframe, disposing another pilot sequence for the second transmit antenna in another of the plurality of symbol positions, not adjacent to the first symbol position, in subcarriers other than those in which are disposed the pilot sequences for the second transmit antenna in the first symbol position.

8. A non-transitory computer readable memory storing a computer program that when executed by a processor causes the processor to perform actions comprising:
arranging data for transmission in a frame structure, the frame structure comprising a series of subframes, each subframe comprising a plurality of frequency-divided sub-carriers, each sub-carrier comprising a plurality of time-divided symbol positions;
determining pilot sequences for aiding a receiver in estimating a channel comprising the sub-carriers over which the data is to be transmitted;
in each subframe, disposing a pilot sequence for a first transmit antenna in a first of the plurality of symbol positions only in every $(2*N)^{th}$ one of the sub-carriers, where N is equal to three or four;
in each subframe, disposing a pilot sequence for a second transmit antenna in the first symbol position only in every $(2*N)^{th}$ one of the sub-carriers, wherein the pilot sequences for the first transmit antenna that are in the first symbol position are in different sub-carriers than the pilot sequences for the second transmit antenna that are in the first symbol position, and wherein the subcarriers in which are disposed the pilot sequences for the first transmit antenna that are in the first symbol position are not adjacent to the subcarriers in which are disposed the pilot sequences for the second transmit antenna that are in the first symbol position; and
directing transmission of the frame comprising the data and disposed pilot sequences over the channel from the first and the second transmit antennas.

9. The computer readable memory of claim 8, wherein the computer program causes the processor to perform actions further comprising disposing at least one further pilot sequence in a subframe in the third to last symbol position.

10. The computer readable memory of claim 8, wherein the computer program causes the processor to perform actions further comprising disposing at least one pilot sequence for a third or fourth transmit antenna in other than the first symbol position.

11. The computer readable memory of claim 8, wherein the pilot sequences for the respective first and second antennas are separated in at least one of frequency and phase from one another; the actions further comprising disposing dedicated pilot sequences for at least one antenna other than the first and the second antenna.

12. The computer readable memory of claim 11, wherein both a specific sub-carrier and a specific symbol position of at least one subframe of the frame in which the dedicated pilot sequences are disposed is based on a received indication of channel quality.

13. The computer readable memory of claim 8, wherein the computer program causes the processor to perform actions further comprising:
in each subframe, disposing another pilot sequence for the first transmit antenna in another of the plurality of symbol positions, not adjacent to the first symbol position, in subcarriers other than those in which are disposed the pilot sequences for the first transmit antenna in the first symbol position; and
in each subframe, disposing another pilot sequence for the second transmit antenna in another of the plurality of symbol positions, not adjacent to the first symbol position, in subcarriers other than those in which are disposed the pilot sequences for the second transmit antenna in the first symbol position.

14. The non-transitory computer readable memory of claim 11, wherein the dedicated pilot sequences are disposed in the fourth and the seventh symbol positions of the at least one subframe.

15. A device comprising:
an interleaver configured to fit input data to time slots;
a serial to parallel converter configured to assemble the interleaved data into parallel blocks;
an encoder configured to map the blocks to symbols;
a memory storing a database of fixed locations within a transmission frame and computer instructions;
a processor configured to execute the instructions thereby causing the processor to dispose pilot sequences in the fixed locations, the fixed locations comprising:
in each subframe of a transmission frame and for a first transmit antenna, a first of a plurality of symbol positions only in every $(2*N)^{th}$ one of the sub-carriers, where N is equal to three or four; and
in each subframe of the transmission frame and for a second transmit antenna, the first symbol position only in every $(2*N)^{th}$ one of the sub-carriers, wherein the pilot sequences for the first transmit antenna that are in the first symbol position are in different sub-carriers than the pilot sequences for the second transmit antenna that are in the first symbol position, and wherein the subcarriers in which are disposed the pilot sequences for the first transmit antenna that are in the first symbol position are not adjacent to the subcarriers in which are disposed the pilot sequences for the second transmit antenna that are in the first symbol position;

the device further comprising at least the first and the second transmit antennas having an input coupled to an output of the processor, said transmit antennas configured to transmit the input data and the pilot sequences in the transmission frame.

16. The device of claim 15, wherein the fixed locations in a subframe further comprises the third to last symbol position.

17. The device of claim 15, wherein the at least first and second transmit antennas further comprise a third and fourth transmit antenna, and wherein the processor is further configured to dispose at least one pilot sequence for the third or fourth transmit antenna is in other than the first symbol position.

18. The device of claim 15, wherein the computer instructions further cause the processor to dispose dedicated pilot sequences within at least one subframe of the transmission frame.

19. The device of claim 18, wherein the computer instructions cause the processor to dispose the dedicated pilot sequences in the fourth and the seventh symbol positions of the at least one subframe.

20. The apparatus of claim 15, wherein the processor is further configured to execute the instructions causing the processor to:
in each subframe, dispose another pilot sequence for the first transmit antenna in another of the plurality of symbol positions, not adjacent to the first symbol position, in subcarriers other than those in which are disposed the pilot sequences for the first transmit antenna in the first symbol position; and
in each subframe, dispose another pilot sequence for the second transmit antenna in another of the plurality of symbol positions, not adjacent to the first symbol position, in subcarriers other than those in which are disposed the pilot sequences for the second transmit antenna in the first symbol position.

21. An integrated circuit configured to arrange pilot sequences in a transmission frame, the transmission frame comprising a plurality of subframes, each subframe comprising sub-carriers and symbol positions, such that:
in each subframe, a pilot sequence for a first transmit antenna is disposed in a first symbol position only in every $(2*N)^{th}$ one of the sub-carriers, where N is equal to three or four; and
in each subframe, a pilot sequence for a second transmit antenna is disposed in the first symbol position only in every $(2*N)^{th}$ one of the sub-carriers, wherein the pilot sequences for the first transmit antenna that are in the first symbol position are in different sub-carriers than the pilot sequences for the second transmit antenna that are in the first symbol position, and wherein the subcarriers in which are disposed the pilot sequences for the first transmit antenna that are in the first symbol position are not adjacent to the subcarriers in which are disposed the pilot sequences for the second transmit antenna that are in the first symbol position;
wherein the respective symbol position and sub-carrier for each of the common pilot sequences is predetermined.

22. The integrated circuit of claim 21, wherein a further pilot sequence is disposed in a subframe at the third to last symbol position.

23. The integrated circuit of claim 21, further wherein at least one pilot sequence for a third or a fourth transmit antenna is disposed in other than the first symbol position.

24. The integrated circuit of claim 21, further configured to arrange dedicated pilot sequences in a symbol position and a sub-carrier of at least one subframe based on an indication of channel quality received from a mobile station.

25. The integrated circuit of claim 24, wherein the pilot sequences for the respective first and second antennas are separated in at least one of frequency and phase from one another.

26. The integrated circuit of claim 21, further configured to arrange pilot sequences such that:
in each subframe, another pilot sequence is disposed for the first transmit antenna in another of the plurality of symbol positions, not adjacent to the first symbol position, in subcarriers other than those in which are disposed the pilot sequences for the first transmit antenna in the second symbol position; and
in each subframe, another pilot sequence is disposed for the second transmit antenna in another of the plurality of symbol positions, not adjacent to the first symbol position, in subcarriers other than those in which are disposed the pilot sequences for the second transmit antenna in the first symbol position.

27. A mobile station comprising a receiver, a memory, and a processor configured to:
receive at the receiver over a channel a transmission frame comprising subframes, sub-carriers and symbol positions;
determine from the memory predetermined relative locations of pilot sequences, said pilot sequences for a first transmit antenna in a first symbol position of each subframe and only in every $(2*N)^{th}$ one of the sub-carriers where N is equal to three or four, and also said pilot sequences for a second transmit antenna in the first symbol position of each subframe and only in every $(2*N)^{th}$ one of the sub-carriers, wherein the pilot sequences for the first transmit antenna that are in the first symbol position are in different sub-carriers than the pilot sequences for the second transmit antenna that are in the first symbol position, and wherein the subcarriers in which are disposed the pilot sequences for the first transmit antenna that are in the first symbol position are not adjacent to the subcarriers in which are disposed the pilot sequences for the second transmit antenna that are in the first symbol position;
estimate the channel using the pilot sequences; and
demodulate symbols of the transmission frame using the estimated channel.

28. The mobile station of claim 27, wherein estimating the channel further comprises using additional pilot sequences in locations that are not predetermined.

29. The mobile station of claim 27, wherein the processor is further configured to determine from the memory predetermined relative locations of pilot sequences comprising:
in each subframe, another pilot sequence for the first transmit antenna disposed in another of the plurality of symbol positions, not adjacent to the first symbol position, in subcarriers other than those in which are disposed the pilot sequences for the first transmit antenna in the first symbol position; and in each subframe, another pilot sequence for the second transmit antenna disposed in another of the plurality of symbol positions, not adjacent to the first symbol position, in subcarriers other than those in which are disposed the pilot sequences for the second transmit antenna in the first symbol position.

* * * * *

UNITED STATES PATENT AND TRADEMARK OFFICE
CERTIFICATE OF CORRECTION

| | | |
|---|---|---|
| PATENT NO. | : 7,983,236 B2 | Page 1 of 1 |
| APPLICATION NO. | : 11/528896 | |
| DATED | : July 19, 2011 | |
| INVENTOR(S) | : Rinne et al. | |

It is certified that error appears in the above-identified patent and that said Letters Patent is hereby corrected as shown below:

Claim 1, col. 19, line 5 delete "(2*N),h" and replace with -- (2*N)th --.

Claim 15, col. 20, line 64 delete "(2*N),h" and replace with -- (2*N)th --.

Signed and Sealed this
Twenty-first Day of February, 2012

David J. Kappos
*Director of the United States Patent and Trademark Office*